(12) United States Patent
Lee et al.

(10) Patent No.: US 11,374,349 B2
(45) Date of Patent: Jun. 28, 2022

(54) RECEPTACLE CONNECTOR DEVICE FOR ELECTRIC VEHICLE USE

(71) Applicant: Cheng Uei Precision Industry Co., Ltd., New Taipei (TW)

(72) Inventors: Yun-Chien Lee, New Taipei (TW);
Sheng-Tsung Yuan, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 499 days.

(21) Appl. No.: 16/664,942

(22) Filed: Oct. 27, 2019

(65) Prior Publication Data
US 2021/0050688 A1 Feb. 18, 2021

(30) Foreign Application Priority Data
Aug. 15, 2019 (CN) .......................... 201921330726.6

(51) Int. Cl.
*H01R 13/52* (2006.01)
*H01R 43/24* (2006.01)
*B60L 53/16* (2019.01)

(52) U.S. Cl.
CPC .............. *H01R 13/52* (2013.01); *B60L 53/16* (2019.02); *H01R 43/24* (2013.01)

(58) Field of Classification Search
CPC .......... H01R 13/52; H01R 43/24; B60L 53/16
USPC ....................................................... 320/107
See application file for complete search history.

(56) References Cited

U.S. PATENT DOCUMENTS

| 10,340,644 | B1* | 7/2019 | Lee ........................ H01R 24/86 |
| 10,431,944 | B1* | 10/2019 | Su .......................... H01R 24/86 |
| 2009/0053931 | A1* | 2/2009 | Islam ...................... H01R 9/05 |
| | | | 439/578 |
| 2010/0087090 | A1* | 4/2010 | Islam ..................... H01R 24/40 |
| | | | 439/578 |
| 2015/0364877 | A1* | 12/2015 | Osawa ................ H01R 13/512 |
| | | | 439/34 |
| 2017/0054248 | A1* | 2/2017 | Moseke ............... H01R 13/504 |
| 2017/0149176 | A1* | 5/2017 | Kamemura ........ H01R 13/7175 |

(Continued)

FOREIGN PATENT DOCUMENTS

| CN | 103545675 A | * | 1/2014 |
| CN | 203503843 U | * | 3/2014 |

(Continued)

*Primary Examiner* — Suresh Memula
(74) *Attorney, Agent, or Firm* — Cheng-Ju Chiang

(57) ABSTRACT

A receptacle connector device for electrical vehicle use in accordance with the present invention is disposed at a battery terminal of an electric vehicle and is connected to a plug connector in a charging station. The receptacle connector comprises an insulating body and a plurality of conducting elements. The insulating body is made of waterproof plastic materials and the plurality of the conducting elements are made of metal materials. The insulating body has a plurality of concentric circular grooves and a transverse portion. The plurality of the conducting elements are respectively disposed in the plurality of the concentric circular grooves, characterized in that: each of the plurality of the conducting elements forms a rough surface, thereby to enlarge contact area between the plurality of the conducting elements and the insulating body in moulding process for firm combination of plastic and metal materials.

5 Claims, 2 Drawing Sheets

(56) References Cited

U.S. PATENT DOCUMENTS

| | | | |
|---|---|---|---|
| 2017/0229804 A1* | 8/2017 | Kurita | B60L 53/16 |
| 2017/0279210 A1* | 9/2017 | Kraemer | H01R 13/506 |
| 2018/0048091 A1* | 2/2018 | Kawai | H01R 24/20 |
| 2018/0212355 A1* | 7/2018 | Kim | H01R 13/5213 |
| 2018/0248275 A1* | 8/2018 | Morita | H01R 4/34 |
| 2018/0331475 A1* | 11/2018 | Yin | H01R 13/6683 |
| 2018/0332726 A1* | 11/2018 | Zhu | H01R 12/7047 |
| 2019/0074650 A1* | 3/2019 | Huang | H01R 13/187 |
| 2019/0109400 A1* | 4/2019 | Takahashi | H01R 13/506 |
| 2021/0336364 A1* | 10/2021 | Li | H01R 43/16 |
| 2021/0384674 A1* | 12/2021 | Frasch | H01R 13/2407 |

FOREIGN PATENT DOCUMENTS

| | | | | |
|---|---|---|---|---|
| CN | 106450920 A | * | 2/2017 | H01R 13/02 |
| CN | 107949959 A | * | 4/2018 | H01R 13/52 |
| CN | 105449451 B | * | 8/2018 | |
| CN | 208299089 U | * | 12/2018 | |
| CN | 210430179 U | * | 4/2020 | B60L 53/16 |
| CN | 111934121 A | * | 11/2020 | |
| CN | 112490729 A | * | 3/2021 | B60L 53/16 |
| CN | 112803201 A | * | 5/2021 | |
| CN | 112838408 A | * | 5/2021 | |
| CN | 112864687 A | * | 5/2021 | |
| CN | 112952443 A | * | 6/2021 | H01R 13/5202 |
| DE | 102010029833 B4 | * | 10/2020 | B60L 53/11 |
| DE | 102019126087 A1 | * | 4/2021 | |
| EP | 2525443 A1 | * | 11/2012 | B60L 53/16 |
| JP | 2013519207 A | * | 1/2011 | |
| WO | WO-9636093 A1 | * | 11/1996 | H01R 13/5227 |
| WO | WO-2008024402 A1 | * | 2/2008 | H01R 13/52 |

\* cited by examiner

RECEPTACLE CONNECTOR DEVICE FOR ELECTRIC VEHICLE USE

BACKGROUND OF THE INVENTION

1. Field of the Invention

The present invention is submitted based on application no. 201921330726.6 of Aug. 15, 2019 as priority in China, incorporated herein by reference in its entirety.

The present invention generally relates to a receptacle connector device for electrical vehicle use, and more particularly to a receptacle connector device for electrical vehicle use that is disposed at a battery terminal of an electric vehicle and is connected to a plug connector in a charging station and has the feature of waterproofness and airtightness of the receptacle connector device.

2. Related Art

On the increasingly serious energy, climate and environmental issues, developing new-energy vehicles has been commonly recognized all over the world. In recent years, the output and distribution of electric vehicles show the increasing tendency year by year, which in turn largely helps to promote the market demand of charging connectors that is used for power supply of the electric vehicles.

As shown in FIG. 1, which is a cross-sectional view of a conventional receptacle connector 100 applied to the charging of an electric vehicle, the conventional receptacle connector 100 mainly includes an insulating body 102 and a plurality of conducting elements 104, 106, 108, 110. A plurality of concentric circular grooves 112, 114, 116, 118 are formed inside the insulating body 102 and have corresponding openings 120, 122, 124, 126 on a surface of the insulating body 102. The plurality of the conducting elements 104, 106, 108, 110 are disposed in the plurality of concentric circular grooves 112, 114, 116, 118 and are connected to a battery terminal of the electric vehicle for inputting supply current. As soon as the insulating body 102 of the conventional receptacle connector 100 docks with a plug connector in a charging station, the plurality of the conducting elements 104, 106, 108, 110 are engaged with conducting elements of the plug connector so as to realize the charging of the electric vehicle.

However, the plurality of the conducting elements 104, 106, 108, 110 are made of metal materials while the insulating body 102 used for holding the plurality of the conducting elements 104, 106, 108, 110 are made of non-metal materials. Under the influence of the environment temperature, cracks may be generated at junctions 128 between the plurality of the conducting elements 104, 106, 108, 110 and the insulating body 102 due to thermal expansion coefficient difference between metal and non-mental materials, which causes leakage of liquid water or water vapor to damp the plurality of the conducting elements 104, 106, 108, 110 inside the insulating body 102, thus to lower the charge efficiency. Therefore, the waterproofness and airtightness of the conventional receptacle connector 100 is insufficient and not satisfying.

SUMMARY OF THE INVENTION

An object of the present invention is to provide a receptacle connector device for electrical vehicle use, in which contact area between an insulating body and a plurality of conducting elements is enlarged to prevent crack generation resulted from the thermal expansion coefficient difference between different materials under the influence of the environment temperature, so as to achieve the waterproofness and airtightness of the receptacle connector device.

To attain this, a receptacle connector device for electrical vehicle use in accordance with the present invention is disposed at a battery terminal of an electric vehicle and is connected to a plug connector in a charging station. The receptacle connector comprises an insulating body and a plurality of conducting elements. The insulating body is made of waterproof plastic materials and the plurality of the conducting elements are made of metal materials. The insulating body has a plurality of concentric circular grooves and a transverse portion transversely interconnecting each of the plurality of the concentric circular grooves. The plurality of the concentric circular grooves are formed inside the insulating body and have corresponding openings on a surface of the insulating body. The plurality of the conducting elements are respectively disposed in the plurality of the concentric circular grooves via the corresponding openings, characterized in that: each of the plurality of the conducting elements forms a rough surface, thereby to enlarge contact area between the plurality of the conducting elements and the insulating body in moulding process for firm combination of plastic and metal materials.

Accordingly, the plurality of the concentric circular grooves are consisting of a first circular groove, a second circular groove, a third circular groove and a fourth circular groove. The plurality of the conducting elements are consisting of a first conducting element, a second conducting element, a third conducting element and a fourth conducting element. The first conducting element, the second conducting element, the third conducting element and the fourth conducting element are respectively disposed in the first circular groove, the second circular groove, the third circular groove and the fourth circular groove. An outer side of the first conducting element is respectively engaged with the transverse portion and an inner wall of the first circular groove to form a first junction where a first rough surface is defined. An outer side of the second conducting element is respectively engaged with the transverse portion and an inner wall of the second circular groove to form a second junction where a second rough surface is defined. An outer side of the third conducting element is respectively engaged with the transverse portion and an inner wall of the third circular groove to form a third junction where a third rough surface is defined. The first rough surface, the second rough surface and the third rough surface are disposed to enlarge contact area between the plurality of the conducting elements and the insulating body in moulding process.

Accordingly, each of the rough surfaces is composed of a plurality of recesses arranged continuously, so that contact area between the plurality of the conducting elements and the insulating body is enlarged in moulding process for firm combination.

Accordingly, the first conducting element is a ground pole, the second conducting element and the third conducting element are conducting sleeves, the fourth conducting element is a signal transmission bar.

DESCRIPTION OF THE PREFERRED EMBODIMENTS

Figure 1:
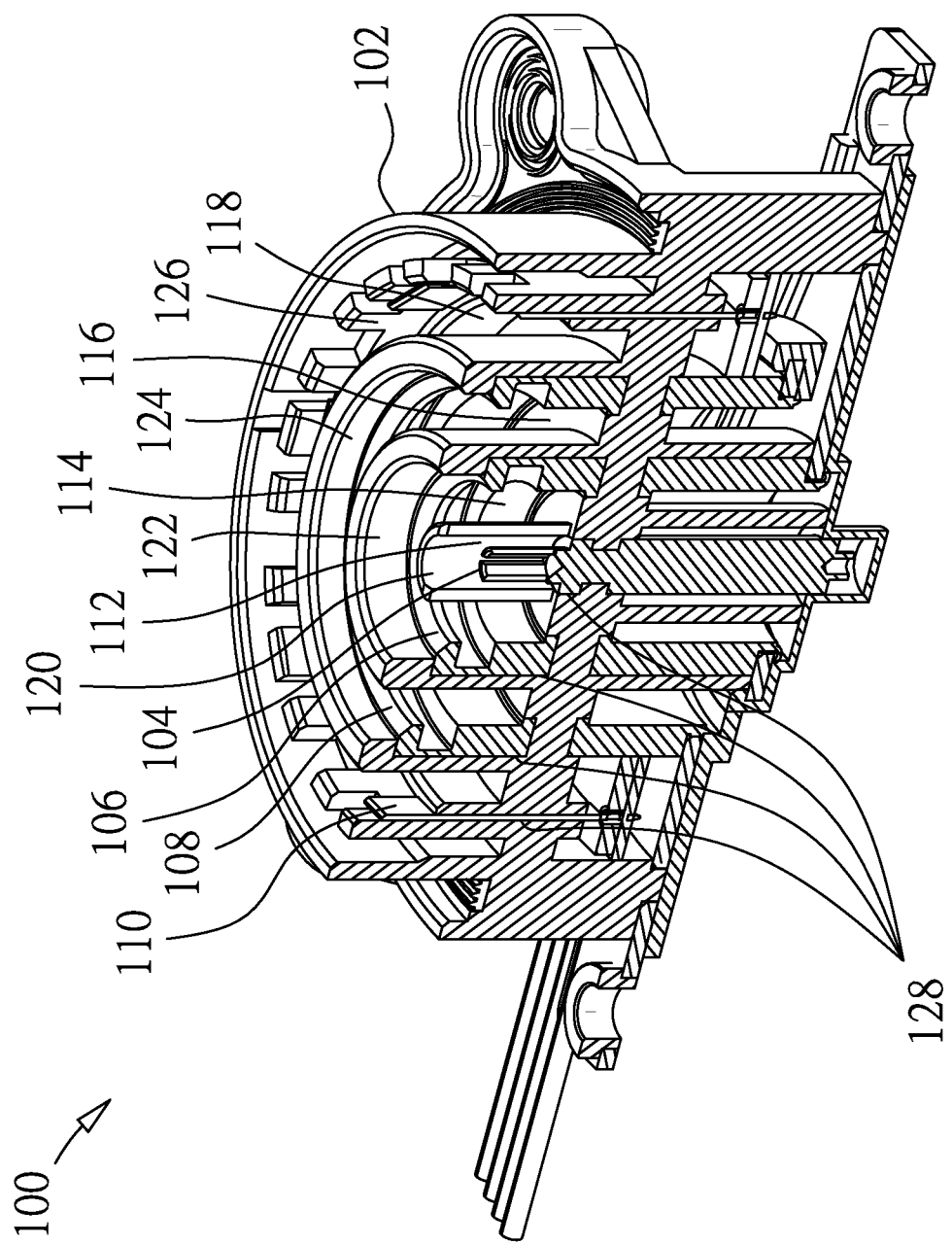
FIG. 1 is a cross-sectional view of a conventional receptacle connector applied to the charging of an electric vehicle.
Figure 2:
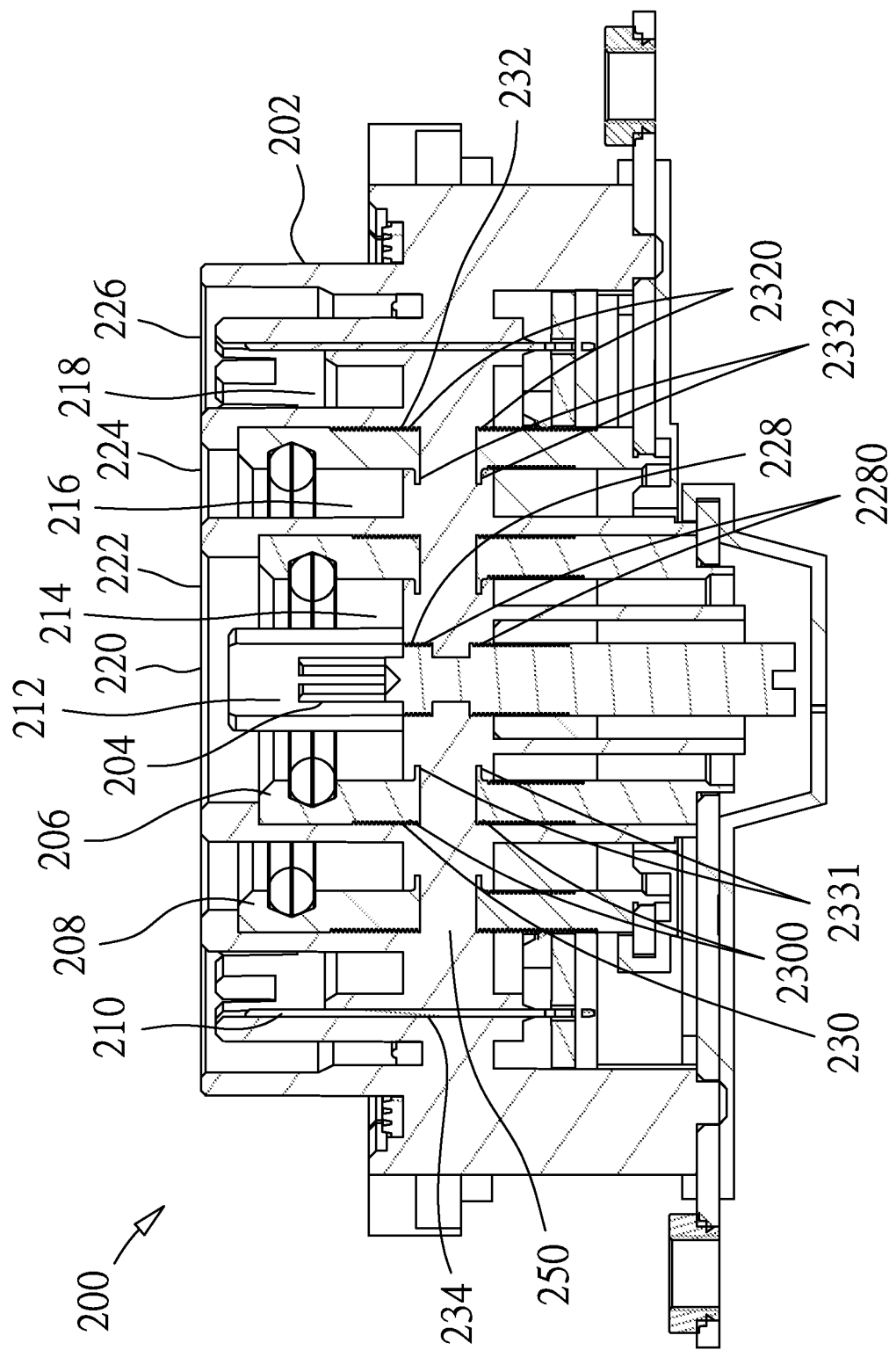
FIG. 2 is a cross-sectional view of a receptacle connector in accordance with the present invention.

Referring to FIG. 2, a receptacle connector in accordance with the present invention is shown. The receptacle connector 200 is disposed at a battery terminal of an electric vehicle and is connected to a plug connector in a charging station. The receptacle connector 200 comprises an insulating body 202 and a plurality of conducting elements 204, 206, 208, 210. The insulating body 202 is made of waterproof plastic materials and the plurality of the conducting elements 204, 206, 208, 210 are made of metal materials. The insulating body 202 has a plurality of concentric circular grooves and a transverse portion 250 transversely interconnecting each of the plurality of the concentric circular grooves. Specifically, the plurality of the concentric circular grooves consisting of a first circular groove 212, a second circular groove 214, a third circular groove 216 and a fourth circular groove 218 are formed inside the insulating body 202 and have corresponding openings 220, 222, 224, 226 on a surface of the insulating body 202. The plurality of the conducting elements consisting of a first conducting element 204, a second conducting element 206, a third conducting element 208 and a fourth conducting element 210 are respectively disposed in the first circular groove 212, the second circular groove 214, the third circular groove 216 and the fourth circular groove 218 via the corresponding openings 220, 222, 224, 226.

The first conducting element 204 may be a ground pole. An outer side of the first conducting element 204 is respectively engaged with the transverse portion 250 and an inner wall of the first circular groove 212 to form a first junction 228 where a first rough surface 2280 is defined. The first rough surface 2280 of the first conducting element 204 may be composed of a plurality of recesses arranged continuously and regularly, so that contact area between the first conducting element 204 and the insulating body 202 is enlarged in moulding process for firm combination.

The second conducting element 206 may be a conducting sleeve. An outer side of the second conducting element 206 is respectively engaged with the transverse portion 250 and an inner wall of the second circular groove 214 to form a second junction 230 where a second rough surface 2300 is defined. The second rough surface 2300 of the second conducting element 206 may be composed of a plurality of recesses arranged continuously and regularly, so that contact area between the second conducting element 206 and the insulating body 202 is enlarged in moulding process for firm combination. An inner side of the second conducting element 206 adjacent to the transverse portion 250 and opposite to the second rough surface 2300 is disposed with a convex ring 2331 which is held by the transverse portion 250 during moulding process, so that contact area between the second conducting element 206 and the insulating body 202 is further enlarged for firm combination of plastic and metal materials.

The third conducting element 208 may be a conducting sleeve. An outer side of the third conducting element 208 is respectively engaged with the transverse portion 250 and an inner wall of the third circular groove 216 to form a third junction 232 where a third rough surface 2320 is defined. The third rough surface 2320 of the third conducting element 208 may be composed of a plurality of recesses arranged continuously and regularly, so that contact area between the third conducting element 208 and the insulating body 202 is enlarged in moulding process for firm combination. An inner side of the third conducting element 208 adjacent to the transverse portion 250 and opposite to the third rough surface 2320 is disposed with a convex ring 2332 which is held by the transverse portion 250 during moulding process, so that contact area between the third conducting element 208 and the insulating body 202 is further enlarged for firm combination of plastic and metal materials.

The fourth conducting element 210 may be a signal transmission bar. An outer side of the fourth conducting element 210 is respectively engaged with the transverse portion 250 and an inner wall of the fourth circular groove 218 to form a fourth junction 234 where a fourth rough surface (not shown) is defined. The fourth rough surface of the fourth conducting element 210 may be composed of a plurality of recesses arranged continuously and regularly, so that contact area between the fourth conducting element 210 and the insulating body 202 is enlarged in moulding process for firm combination.

As described above, the plurality of the conducting elements 204, 206, 208, 210 form the rough surfaces on the junctions 228, 230, 232, 234, thereby to enlarge contact area between the plurality of the conducting elements 204, 206, 208, 210 and the insulating body 202 in moulding process for firm combination of plastic and metal materials, to prevent crack generation resulted from the thermal expansion coefficient difference between different materials under the influence of the environment temperature, so as to achieve the waterproofness and airtightness of the receptacle connector device.

It is understood that the invention may be embodied in other forms within the scope of the claims. Thus the present examples and embodiments are to be considered in all respects as illustrative, and not restrictive, of the invention defined by the claims.

What is claimed is:

1. A receptacle connector device for electrical vehicle use, disposed at a battery terminal of an electric vehicle and connected to a plug connector in a charging station, the receptacle connector comprising an insulating body and a plurality of conducting elements, the insulating body made of waterproof plastic materials and the plurality of the conducting elements made of metal materials, the insulating body having a plurality of concentric circular grooves and a transverse portion transversely interconnecting each of the plurality of the concentric circular grooves, the plurality of the concentric circular grooves formed inside the insulating body and having corresponding openings on a surface of the insulating body, the plurality of the conducting elements respectively disposed in the plurality of the concentric circular grooves via the corresponding openings, wherein:

each of the plurality of the conducting elements forms a rough surface, thereby to enlarge contact area between the plurality of the conducting elements and the insulating body in moulding process for firm combination of plastic and metal materials, to prevent crack generation resulted from the thermal expansion coefficient difference between different materials under the influence of the environment temperature, so as to achieve the waterproofness and airtightness of the receptacle connector device.

2. The receptacle connector device for electrical vehicle use as claimed in claim 1, wherein the plurality of the concentric circular grooves are consisting of a first circular groove, a second circular groove, a third circular groove and a fourth circular groove, the plurality of the conducting elements are consisting of a first conducting element, a second conducting element, a third conducting element and a fourth conducting element, the first conducting element, the second conducting element, the third conducting element and the fourth conducting element are respectively disposed in the first circular groove, the second circular groove, the third circular groove and the fourth circular groove, an outer side of the first conducting element is respectively engaged with the transverse portion and an inner wall of the first circular groove to form a first junction where a first rough surface is defined, an outer side of the second conducting element is respectively engaged with the transverse portion and an inner wall of the second circular groove to form a second junction where a second rough surface is defined, an outer side of the third conducting element is respectively engaged with the transverse portion and an inner wall of the third circular groove to form a third junction where a third rough surface is defined, the first rough surface, the second rough surface and the third rough surface are disposed to enlarge contact area between the plurality of the conducting elements and the insulating body in moulding process.

3. The receptacle connector device for electrical vehicle use as claimed in claim 2, wherein the first conducting element is a ground pole, the second conducting element and the third conducting element are conducting sleeves, the fourth conducting element is a signal transmission bar.

4. The receptacle connector device for electrical vehicle use as claimed in claim 2, wherein an inner side of the second conducting element adjacent to the transverse portion and opposite to the second rough surface is disposed with a convex ring which is held by the transverse portion during moulding process, an inner side of the third conducting element adjacent to the transverse portion and opposite to the third rough surface is disposed with another convex ring which is held by the transverse portion during moulding process, so that contact areas between the second conducting element and the insulating body and between the third conducting element and the insulating body are further enlarged for firm combination of plastic and metal materials.

5. The receptacle connector device for electrical vehicle use as claimed in claim 1, wherein each of the rough surfaces is composed of a plurality of recesses arranged continuously, so that contact area between the plurality of the conducting elements and the insulating body is enlarged in moulding process for firm combination.

\* \* \* \* \*